350-339 SR

XR 3,725,899

United State

Greubel

[11] 3,725,899

[45] Apr. 3, 1973

[54] DATA EXHIBITING SCREEN DEVICE WITH A LIQUID-CRYSTAL LAYER, AND METHOD OF MANUFACTURE

[75] Inventor: Waldemar Greubel, Munich, Germany

[73] Assignee: Siemens Aktiengesellschaft, Berlin, Germany

[22] Filed: Oct. 21, 1970

[21] Appl. No.: 82,642

[30] Foreign Application Priority Data

July 29, 1970 Germany....................P 20 37 676.5

[52] U.S. Cl.......340/324 M, 178/7.3 D, 315/169 TV, 340/166 EL, 350/160 LC

[51] Int. Cl...............................................G08b 5/36

[58] Field of Search......340/324 R, 166 EL; 315/169 TV; 350/150, 160; 178/7.3 D

[56] References Cited

UNITED STATES PATENTS

| | | | |
|---|---|---|---|
| 2,998,546 | 8/1961 | Kuntz et al. | 340/166 EL |
| 3,041,490 | 6/1962 | Rajchman et al. | 315/169 TV |
| 3,197,744 | 7/1965 | Lechner | 315/169 TV |
| 3,258,644 | 6/1966 | Rajchman | 340/166 EL |
| 3,290,554 | 12/1966 | Sack | 315/169 TV |
| 3,410,999 | 11/1968 | Fergason et al. | 340/166 EL |
| 3,440,620 | 4/1969 | French | 350/160 R |
| 3,499,702 | 3/1970 | Goldmacher et al. | 350/150 |
| 3,499,704 | 3/1970 | Land et al. | 350/160 R |
| 3,551,689 | 12/1970 | Zanoni | 350/160 X |

*Primary Examiner*—David L. Trafton
*Attorney*—Curt M. Avery, Arthur E. Wilfond, Herbert L. Lerner and Daniel J. Tick

[57] ABSTRACT

A data exhibiting screen device comprises a layer of liquid crystals whose light scattering or transparency is controllable by applying an electric field. A ferroelectric layer of ceramic material extends face-to-face in parallel proximity to the liquid-crystal layer and constitutes a capacitance controllable by the magnitude of the applied electric field. Electric field means in the form of a cross-bar arrangement supply the field excitation.

14 Claims, 11 Drawing Figures

3725899
OR IN 340/324M

DATA EXHIBITING SCREEN DEVICE WITH A LIQUID-CRYSTAL LAYER, AND METHOD OF MANUFACTURE

My invention relates to a device for exhibiting data on a picture screen with the aid of liquid crystals whose optical behavior, namely the light scattering or transparency, are controllable by applying an electrical field, and the invention also relates to a method of producing such a device.

It has become known, for example from Proc. IEEE, Volume 56 (1968) pages 1162 to 1171, to control the light scattering or transparency of a thin nematic liquid-crystal layer by applying an electrical field. This possibility has made it appear promising to achieve a flat panel-type design of a picture screen for data indication. For controlling such an indicating screen, a matrix arrangement of column and line paths resulting in a raster of points constituted by the intersections of the matrix has been used. With all matrix-shaped selection methods as heretofore known, it is inevitable, in principle, that aside from the desired maximal voltage at the particular raster point selected by an X-conductor path electrode and a Y-conductor path electrode, there simultaneously occurs at many other raster points a voltage whose magnitude is up to one-half of the maximal voltage. Such appreciable spurious voltages cause the indicating screen to be lit up at undesired localities because in the liquid crystal layers of the known screen devices the relation between field strength and transparency or scattering shows virtually no threshold behavior. According to pages 52/53 of the Digest of Technical Papers presented at the IEEE International Solid-State Circuits Conference in Feb. 1969, attempts have been made to avoid the trouble by providing each raster point with an additional threshold response for control voltage. For this purpose, each raster point has to be coordinated with one of two diodes in integrated-circuit technique. These attempts, however, offer little prospects because of excessive technological difficulties, of the poor yield obtainable in this matter, and the unfavorable stray of the essential properties. Another problem encountered with the control of liquid-crystal components results from the fact that the excitation time of the liquid crystals is relatively long, this being the reason why a rapid writing (entering or changing of data) on the picture screen has heretofore been possible only with a large expenditure in equipment and space. For the same reason, the obtainable picture area would be very much limited in practice.

It is an object of my invention to provide the indicating raster elements of a liquid-crystal screen device with a response threshold in a technologically simple manner, thus reducing the difficulties heretofore encountered and accordingly decreasing the manufacturing cost while affording a larger size of the screen than heretofore economical feasible.

Another object of the invention is to afford a rapid writing of characters on the liquid-crystal screen, as well as a slow writing of such characters depending upon the particular preference of the intended application.

Still another object of my invention is to devise a liquid-crystal screen which affords an indication of better light intensity than in known devices and in which the intensity contrast is largely independent of ambient illumination.

It is also an object of the invention to provide a liquid-crystal screen which requires minimized electrical power for its operation and which can be controlled by relatively low voltages.

A further object of the invention is to produce a liquid-crystal screen of the above-mentioned type which has a particularly long useful life.

To achieve these objects and in accordance with my invention, a liquid-crystal screen, generally of the type mentioned above, is provided with a layer of ferroelectric material, preferably a ceramic material, which is arranged parallel and adjacent to the liquid-crystal layer and constitutes a variable capacitance controllable by the magnitude of the applied electric field. The ferroelectric material preferably is ceramic lead-circonate-titanate.

By virtue of the fact that the capacitance of a ferroelectric layer is dependent upon voltage, an indicator screen according to the invention endows the liquid-crystal elements of the exhibiting screen proper with a voltage threshold below which there is no response.

According to another feature of the invention, a liquid-crystal screen for slow writing of data comprises a layer of ferro-electric ceramic material parallel and adjacent in face-to-face relation to the layer formed of liquid crystal and is further provided with an intermediate electrode per raster element between these two layers, the "horizontal" X-conductor paths being located on one outer side of this double layer arrangement and the "vertical" Y-conductor paths on the other outer side. The terms "horizontal" and "vertical" are here used to denote the arrangement of the two arrays of conductors which within each array are parallel to each other and extend at an angle, preferably 90°, to the conductor paths of the other array. Thus, the conductor paths of one array usually constitute vertical columns and those of the other array represent horizontal lines.

According to another feature of the invention, a screen device for rapid writing-in of data is provided with an insulating layer between the layer of ferroelectric material and the layer of liquid crystals. The X-conductor paths are arranged on the outer side of the ferroelectric layer, and the Y-conductor paths are arranged on the same ferroelectric layer, but on its inner side facing the insulating layer. An electrode spot is located at each intersection point of the X and Y-conductor paths on the Y-conductor side of the ferroelectric layer. These electrode spots are insulated from the Y-conductor paths and are each electrically connected with one of respective electrode spots on the inner side of the liquid-crystal layer adjacent to the insulating layer. A front electrode common to all raster elements is arranged on the outer side of the liquid-crystal layer.

The above-mentioned and further objects, advantages and features of the invention, said features being set forth in the claims annexed hereto, will be apparent from, and will be described in the following with reference to embodiments of indicator screen devices according to the invention illustrated by way of example on the accompanying drawings, in which:

Figure 1:
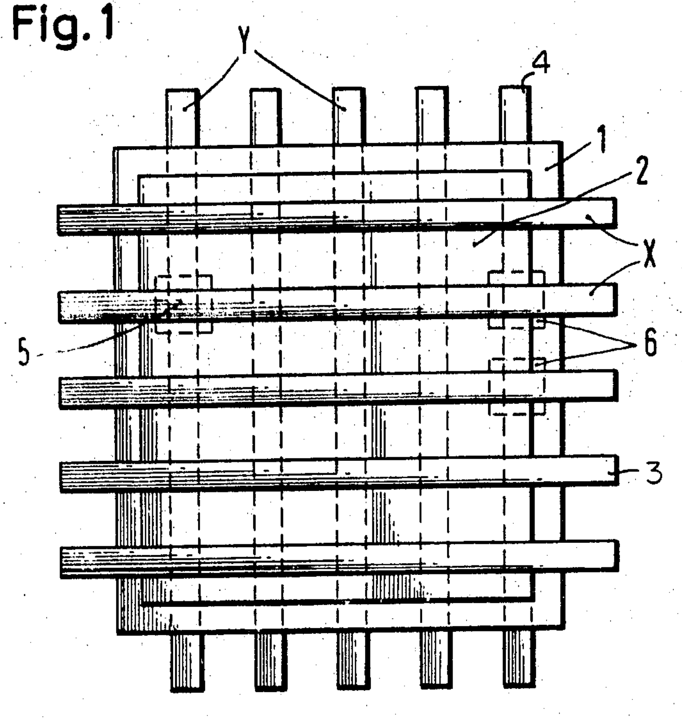
FIG. 1 is a schematic front view of a data indicating screen device for slow writing-in operation.
Figure 7:
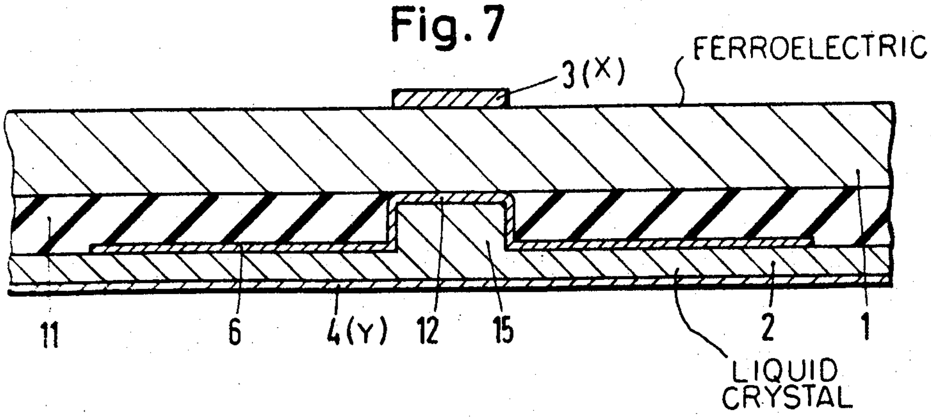
FIG. 7 is a cross section of a raster element appertaining to a slow-writing screen device substantially corresponding to FIG. 1.
Figure 8:
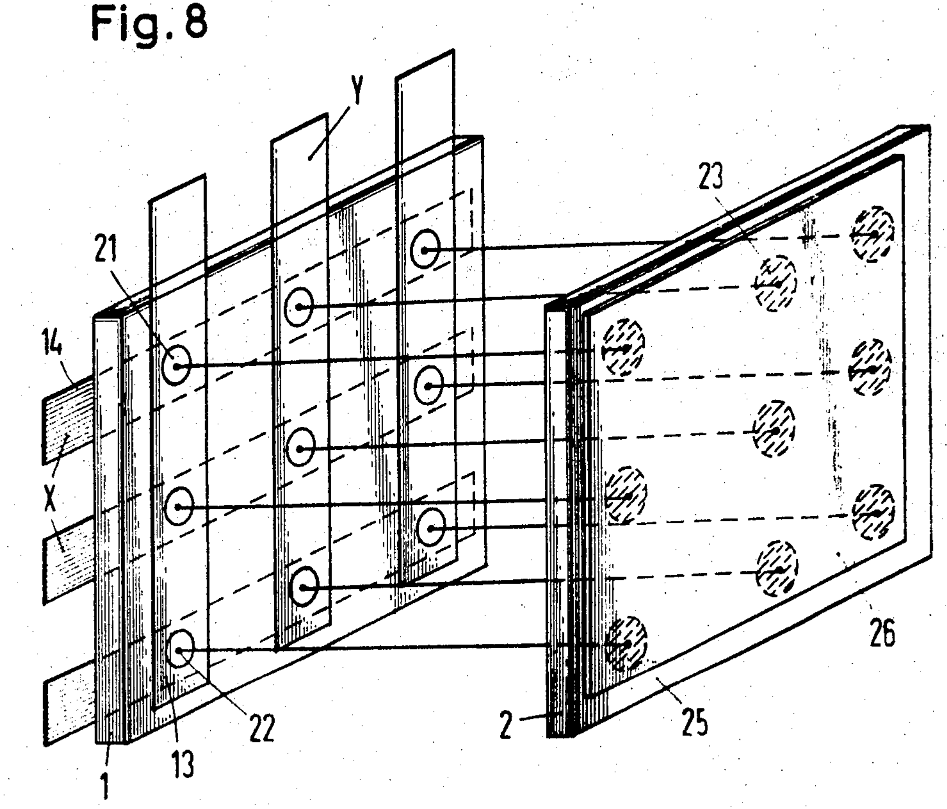
FIG. 8 is an exploded and perspective illustration of a screen device for rapid writing.
Figure 11:
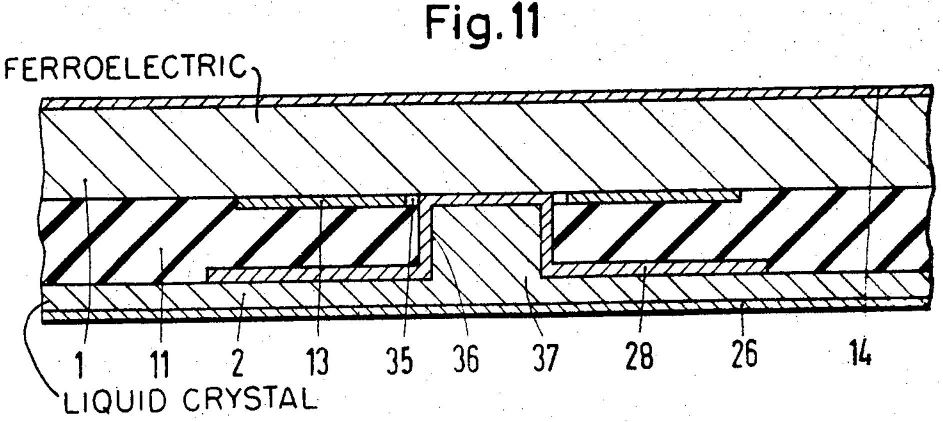
FIG. 11 is a cross section of a raster element for rapid writing in a device according to FIGS. 8 and 10.

The indicating screen illustrated in FIG. 1 for slow writing of data comprises a layer 1 of ferroelectric ceramic material, and a layer 2 of liquid crystals extending parallel and face-to-face to the layer 1 (see also FIGS. 7, 8 and 11). In FIG. 1 the ceramic layer 1 is shown larger than the layer 2 for illustrative reasons. In reality, the two layers preferably have the same length and width. The double layers 1, 2 carry on the respective outer faces the X-electrodes 3 and Y-electrodes 4 (see also FIG. 8). Each intersection of an X-electrode with a Y-electrode constitutes a raster point 5 of the screen. An intermediate electrode 6 (see also FIG. 7) is interposed at each raster point 5 between the ceramic layer 1 and the liquid-crystal layer 2. It will be understood that the liquid-crystal layer 2 in FIG. 1 (and FIG. 7) must be kept confined in the layer space by a transparent front pane of glass or plastic such as by a transparent front electrode member as shown at 26 in FIG. 11.

Any liquid-crystal substance is applicable, for example an MBBA liquid crystal N-(p medhoxy-benzilidene)-p-n-butylaniline, which retains its liquid-crystal qualities in a relatively large temperature range and does not necessarily require auxiliary heating means. However, other liquid-crystal substances are also suitable, such as those of the class of organic components known as Schiff bases, or APAPA anisylideneparaaninophenylacetate, or p-azoxyanisole, even through auxiliary temperature regulating means may be needed to maintain the substance in the nematic range.

Among the known ferroelectric materials, the use for the purpose of the invention of lead-circonite-titanate ceramic has been found preferable. Up to a thickness of about 60 microns this material is transparent if the surface is polished, and remains translucent up to a thickness of a few 100 microns. The ceramic material can be produced readily and cheaply in any size desired and is mechanically stable and little sensitive to moisture. The electrical properties are sufficiently independent of temperature for the purpose of the invention. The ferroelectric ceramics, especially lead-circonate-titanate material, afford obtaining a hysteresis characteristic whose curve comes very close to a rectangle. Aging phenomena are very slight. The electric resistivity of these ceramic materials is very high and is manipulatable by corresponding chemical doping. In connection with this use of these ceramic materials it is also important that cross-talk effects between adjacent ceramic elements become discernible only if the spacing between the electrodes is smaller than 50 microns. By suitable dimensioning, these marginal effects at the electrodes (stray capacitances) are kept slight because they would tend to increase the coercive field strength and to reduce the "rectangularity" of the hysteresis curves.

Other ferroelectric ceramics than lead-circonate-titanate are likewise suitable for devices according to the invention. For example, similarly good results are obtained with barium-titanate ($BaTiO_3$). Also applicable are $KNbO_3$ and other ferroelectric ceramics such as those mentioned on page 225 in volume 5 of McGraw Hill Encyclopedia of Science and Technology (1960).

Figure 2:
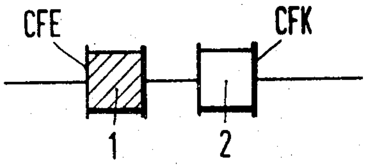
FIG. 2 is a substitute circuit diagram for one raster element in a screen device according to FIG. 1.

FIG. 2 is an electrical substitute diagram for an individual raster point 5 in a screen device as shown in FIG. 1. The substitute diagram comprises a series connection of the capacitance CFE of a ferroelectric element 1 and the capacitance CFK of a liquid-crystal element 2. When an alternating voltage is impressed upon this series connection, the voltage at the capacitance CFK of the liquid-crystal element 2 is proportional to this charge QFE imposed upon the capacitance CFE of the ferroelectric element 1 since the charges of both capacitors CFE, CEF are always equal. The capacitance CFK of a liquid-crystal element 2 is by a multiple larger than the capacitance CFE of a ferroelectric element 1 so that an applied voltage U is virtually placed entirely upon the capacitance CFE of the ferroelectirc element 1. These capacitance conditions, particularly their technological realization, will be more fully explained hereinbelow. In applying an alternating voltage, the voltage change U at the capacitance CFK of a liquid-crystal element 2 is proportional to the particular change in electrical displacement density of the ferroelectric element 1.

Figure 3:
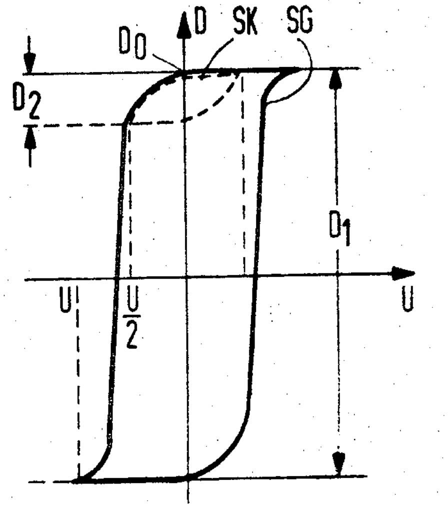
FIG. 3 is explanatory and shows a hysteresis curve of the ferroelectric ceramic employed, when operating without bias voltage and at different voltage amplitudes.

FIG. 3 schematically illustrates the hysteresis characteristic of a ferroelectric ceramic element 1 that exhibits a nearly rectangular configuration. When applying an alternating voltage of the amplitude U to the above-described series connection of the capacitances CFE and CFK, the large loop Sg is traversed, whereas when alternating voltage of the amplitude U/2 is applied, the small loop Sk shown in FIG. 3 by broken lines is traversed. Assume that the initial state of polarization of the ceramic elements 1 is at point DO in both cases. The maximal voltages UFK 1, UFK 2 at the liquid-crystal element 2 during both cycles represented respectively by the full-line and the broken-line hysteresis curves in FIG. 3 are released to each other like the two changes in displacement density D1 and D2 of the ceramic elements relative to each other.

Figure 4:
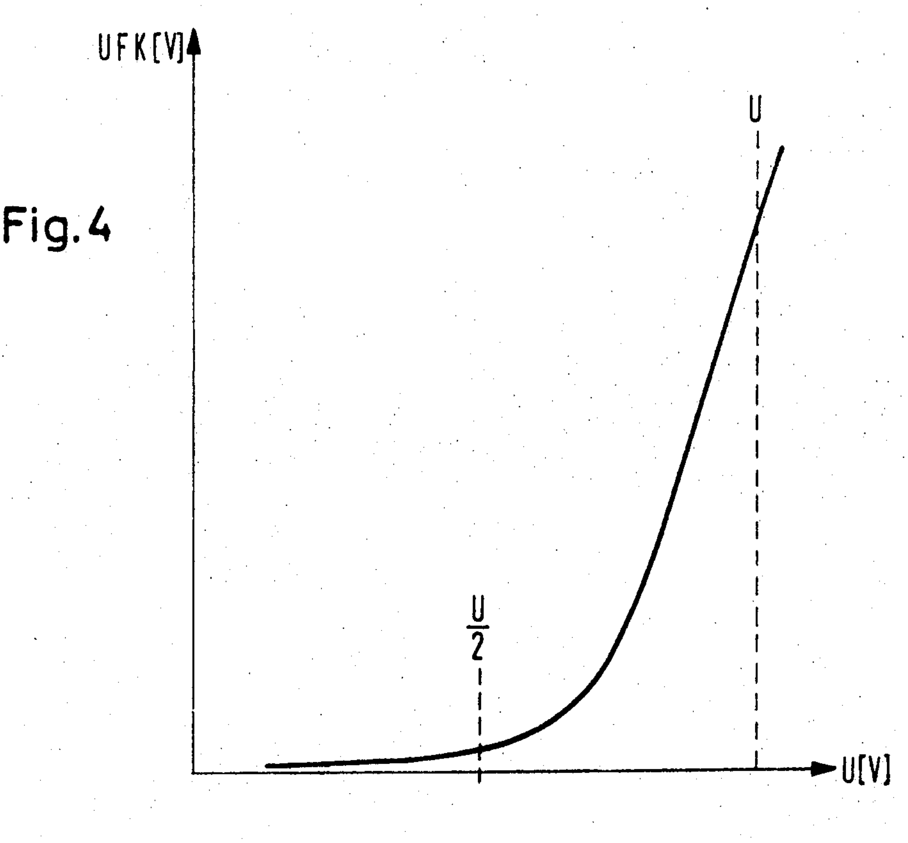
FIG. 4 is a voltage diagram relating to the voltage applied to the liquid-crystal layer of the same screen device.

The diagram in FIG. 4 represents the relation between the voltage U applied to the above-described series connection (FIG. 2) on the one hand, and the voltage amplitude UFK at the liquid-crystal elements 2 on the other hand. This curve exhibits a diode characteristic which becomes the more pronounced the more the hysteresis characteristic approaches a rectangular configuration. As will be seen from the course of the curve in FIG. 4, the spurious voltages occurring at the conductor-path matrix can be made ineffective. It is also of interest that the requirement of having the capacitance CFK of the liquid-crystal elements 2 much larger than the capacitance CFE of a ceramic element, can be moderated the more the hysteresis loop approaches the ideal rectangular shape, while still obtaining a sufficient diode characteristic. For keeping the control voltages as small as feasible, a capacitance CFK of the liquid-crystal elements 2 charged up by a writing pulse is supposed not to become appreciably discharged within a period of time in the order of magnitude corresponding to the excitation time of the liquid-crystal element 2. In the known liquid crystals the minimum of this excitation time is about 0.1 millisecond. For that reason, it is preferable to have the polarity of the writing pulse change with each repetition of the picture on the screen so that each time the hysteresis loop is traversed up to one-half, namely alternately in one and then in the other half. On the other hand, it is preferable to use liquid crystals having a highest feasible ohmic resistivity so that the self-discharge of the capacitances CFK is delayed as much as possible.

Since the electric resistivity of the applicable ferroelectric ceramic materials 1 is several orders of magnitude higher than the resistivity of the liquid crystals 2, the above-described arrangement can also be operated with a bias voltage UV. This can be done by applying a direct voltage UV to the series connection of the capacitances CFE, CFK, which direct voltage is then virtually impressed entirely on one ceramic element 1. The bias voltage UV is so chosen that the ceramic elements 1 are saturated in the initial state. When operating with such a bias voltage, the writing pulses are direct-voltage pulses whose polarity is reversed relative to the bias voltage UV.

Figure 5:
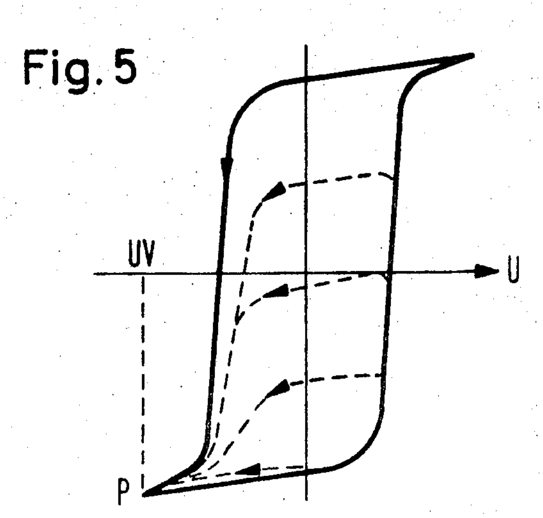
FIG. 5 is an explanatory diagram of the hysteresis curve of the ferroelectric ceramic employed, operating with bias voltage and different voltage amplitudes.

FIG. 5 exemplifies hysteresis curves of the ceramic elements 1 when applying a bias UV and direct-voltage pulses of respectively different amplitudes. In the initial state, the respective ceramic elements 1 are saturated according to point P in FIG. 5. When operating with a bias voltage UV then, if it should become necessary for other reasons, a ceramic material of the type having a less or not pronounced rectangular hysteresis curve can be used without foregoing an improved diode characteristic as compared with alternating-voltage operation. On the other hand, when using a ferroelectric ceramic material with a sufficiently rectangular hysteresis loop, a graduated scale of brightness values of the indicating elements can be obtained by varying the pulse amplitudes.

Figure 6:
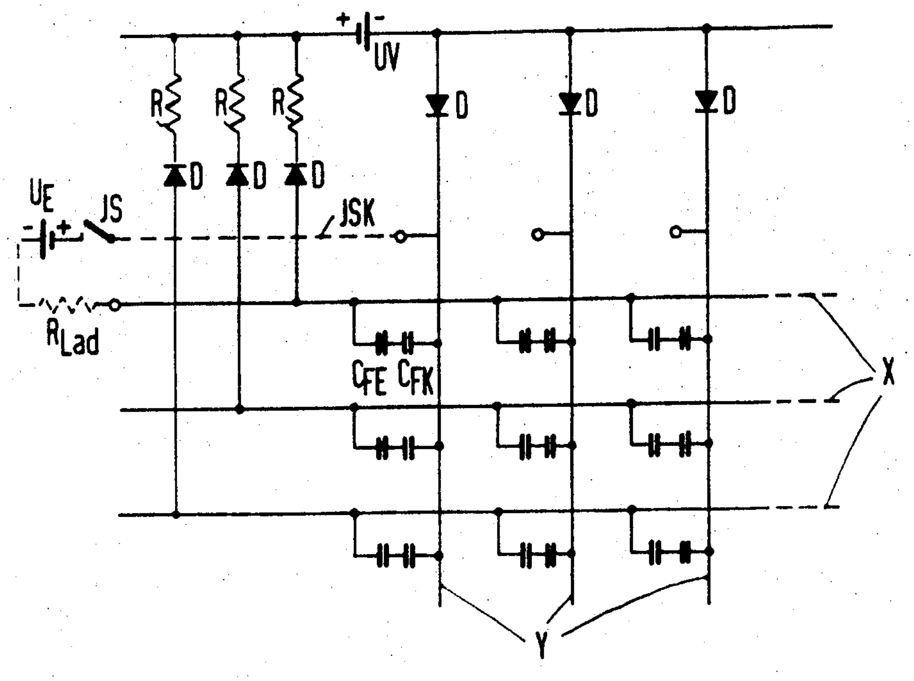
FIG. 6 is a circuit diagram for controlling the raster elements of the data indicating screen for slow writing-in operation, the screen being in accordance with FIG. 1.

The circuit diagram of FIG. 6 relates to the control of the raster points 5 of an indicating screen device according to the invention which is operated with a bias voltage UV and which is suitable for the slow writing of the data onto the screen. The Y and X-electrode paths denoted by X and Y in FIG. 6 are connected to a direct voltage source UV through respective decoupling diodes of very slight capacitance. The resistors R are very high-ohmic and serve, inter alia, to prevent a too rapid discharging of the capacitances. The schematically represented electronic switch GS which when operating with bias voltage UV needs to switch pulses of only one polarity, must possess a very high blocking (inverse) resistance. A switching circuit JSK is shown in FIG. 6 by a broken line, this circuit connecting the electronic pulse switch JS with one of the respective Y-electrode conductors.

In the circuit for controlling the raster points 5 of an indicating screen operated without bias voltage, the pulse switch JS as described above, must switch pulses of alternating electric polarity.

FIG. 7 shows the cross section of one of the raster elements 5 of an indicating screen for slow writing operation. Since the effective dielectric constant of the ceramic layer 1 is always greater than the dielectric constant of the liquid crystals 2, and since the thickness of the ceramic layer 1 should be kept as small as feasible in order to operate with small control pulses UE, the electrode areas pertaining to a raster element 5 are smaller on the ceramic layer 1 than on the liquid-crystal layer 2. This feature readily permits meeting the capacitance conditions. For this purpose an insulating layer 11 is disposed between the ceramic layer 1 and the liquid-crystal layer 2. The insulating layer 11 has a circular hole 12 at each raster point 5, the diameter of the hole 12 being equal to the width of the column electrode 3 on the outer side of the ceramic layer 1. Intermediate electrodes 6, for example of circular shape, are vapor-deposited in concentric relation to the openings 12. Cylindrical bulges 15 of the liquid-crystal layer 2 enter into, or pass through, the respective holes 12 into the insulating layer 11. At these localities the liquid-crystal layer 2 cannot be excited on account of the layer thickness being too large; but this does not cause any disturbance or detriment because of the very small hole diameter. The line (Y) electrode 4 on the outer side of the liquid crystal layer 2 has a thickness approximately equal to the diameter of the intermediate electrode 6. For satisfying the capacitance conditions, the width of the column (X) electrodes 3 is made smaller than the width of the line (Y) electrode 4.

The principle of a screen device that affords rapid writing will be explained with reference to FIG. 8. The X-electrode paths are arranged on one side of the ceramic layer 1, the Y-conductor paths being located on the opposite side of the same layer. A very small electrode spot 22 electrically insulated from the Y-paths is located at each intersection point 21 of the X and Y-electrode paths, the spot 22 being situated on the Y-conductor side of the ceramic layer 1. A corresponding electrode spot 23 is located on the rear side of the liquid-crystal layer 2. The two spots 22 and 23 at each intersection are electrically connected with each other. A common, uniform and transparent front electrode 26 is provided on the front side 25 of the liquid-crystal layer 2.

Figure 9:
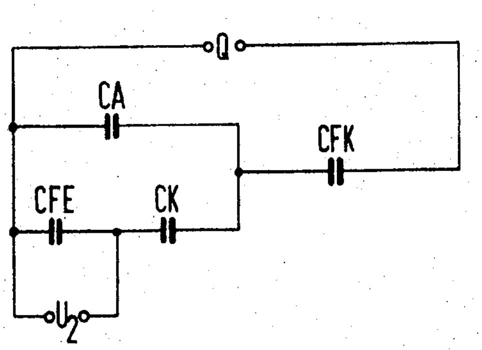
FIG. 9 is a substitute circuit diagram of a raster element of the screen device shown in FIG. 8.
Figure 10:
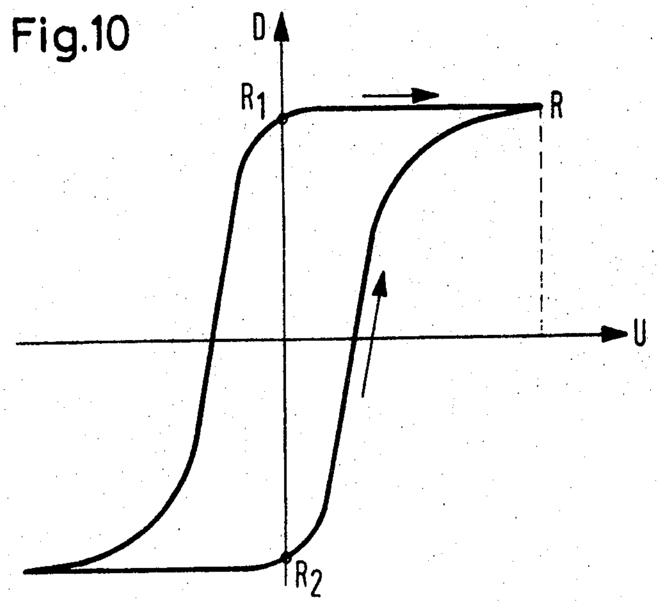
FIG. 10 is a hysteresis diagram of a ferroelectric ceramic employed in a device according to FIGS. 8 and 9.

The substitute circuit diagram in FIG. 9 represents one of the raster elements in an indicating screen which affords a rapid writing operation and thus corresponds to one of the raster elements in a device according to FIG. 8. In the diagram of FIG. 9 the capacitance of a ceramic element 1 between the X and the Y-conductor path electrodes 13, 14 is denoted by CFE. The capacitance of a ceramic element 1 with an X-path electrode 14 and an electrode spot 22 is denoted by CA, the capacitance of a liquid-crystal element 2 between an electrode spot 23 and the front electrode by CFK, and the capacitance between an electrode spot 22 and the appertaining Y-path electrode 13 by CK. At the beginning of the writing operation, the ceramic elements of all raster points 5 are in the same condition of polarization in accordance with point R1 in FIG. 10. A negative direct-voltage pulse U1 is applied between the line (X) electrodes 14 and the column (Y) electrodes 13 of the raster points that are to be excited. This negative pulse controls the ceramic elements to flip to a remanence condition R2 (FIG. 10). In this manner, the information is rapidly written into the ceramic layer 1 since the ceramic material 1 affords being readily and very rapidly polarized, the order of magnitude of the polarizing time being 1 microsecond.

Accordingly, the pulse sequence at rapid writing is about 1 /u sec. That is, whenever a character element is written, the time needed is in the order of 1 microsecond. Likewise, an entire line can be written within this interval of 1 microsecond. In contrast, the slow writing the completion of a character element or line requires about 1 millisecond.

A current source Q issuing periodic voltage pulses is connected between all line electrodes X and the common front electrode 26 upon which the liquid-crystal layer 2 is located. By proper dimensioning of the capacitances CFE, CFK, CK, CA it can be made certain that these excitation pulses, at those raster elements whose ceramic elements 1 are in the state R1 and hence not to be excited, are virtually entirely applied to the ceramic layer 1, whereas at the other raster elements that are excited and hence are in the other state R2, these excitation pulses virtually are entirely applied to the liquid-crystal layer 2. A voltage pulse from source Q therefore has the effect that the ceramic elements 1 are tripped to flip from the state R 2 to the opposite remanence state R 1. This cancels the information previously stored in the ceramic layer 1; but since simultaneously the corresponding liquid elements 2 have become excited, the information is rapidly written into the ceramic layer 1 where it is temporarily memorized; and a voltage pulse from source Q applied between the common front electrode 26 and all of the line (X) electrodes causes the entire picture contents or set of data to be made visible by the changing color, transparency or reflectivity within the liquid-crystal layer. These phenomena are rapidly repeated as long as the information is to be indicated on the screen panel.

According to FIG. 11 the cross section of a raster element in a panel structure as shown in FIG. 8 comprises an insulating layer 11 between the ceramic layer 1 and the liquid-crystal layer 2. The line electrodes 14 are located on the outer side of the ceramic layer 1. The column electrodes 13 are disposed between a ceramic layer 1 and the insulation layer 11. The column electrodes 13 have a hole 35, for example of circular shape, at each raster point. Accordingly, the insulating layer 11 has at each raster point a hole 26 of corresponding circular shape, and a cylindrical projection or bulge 37 of the liquid-crystal layer 2 extends into the hole 26. The above-described electrode spots 22 and 23 represented in FIG. 8 are preferably combined to a circular read-out electrode illustrated in FIG. 11. The read-out electrode 28 is vapor-deposited upon the insulating layer 11 on the side facing the liquid-crystal layer 2, the read-out electrode being concentric to the cylindrical bulge 37 of the liquid-crystal layer 2. A large common front electrode plate 26 of transparent material is situated on the outer side of the liquid-crystal layer 2. The plate 26 consists of glass or plastic upon which the transparent front electrode is deposited.

Examples of suitable mechanical dimensions of the components in devices according to the invention are:

about 100 microns thickness of the ceramic layer,
about 20 microns thickness of the insulating layer,
about 5 to 30 microns of the liquid-crystal layer. The mutual spacing of the X- and Y-electrodes, as well as the overall area of the screen can be chosen at will. The resistivity of the liquid-crystal is in the order of $10^{10}$dm cm, the resistivity of the ceramic layer in the order of at least $10^{14}$ dm cm. The operating voltages are preferably in the range of about 100 to about 200 Volt.

In devices according to the invention the ceramic layer 1 need not necessarily consist of a single coherent body but may be composed of individual component pieces, the gaps between these pieces being filled with insulating material.

The above-described devices according to the invention for the indication of data can be operated in transmission or in reflection. For transmission a light source is located behind the screen panel and all of the electrodes and intermediate layers are made of transparent material, using for example $SnO_2$ as insulating substance. For reflective operation, the light source is located in front of the screen panel and the intermediate electrodes or read-out electrodes are made of material having a reflecting surface, preferably aluminum or nickel.

Devices according to the invention permit using any known liquid crystal, including colored crystals. In this manner the data or picture appearing on the screen can be produced in color. In addition, it is preferable to employ liquid crystals which exhibit a storing or memory effect.

The raster elements of indicating screen devices according to the invention are preferably produced by the following method. Employed as an intermediate layer 11 is a highly insulating foil of photosensitive material. This foil is face-to-face bonded to the surface of the ceramic layer 1. This is preferably done by pressure rolling the foil onto the ceramic layer. Thereafter the insulating layer is exposed photographically at the raster points 5, and holes are then etched out at the exposed localities in accordance with the photoresist technique. Subsequently, the circular intermediate electrodes 28 are vapor-deposited upon the insulating layer 11 and into the cylindrical openings 37.

By virtue of the invention, as embodied in the devices described hereinabove, the switching ratios desired for controlling the liquid-crystal screen with the aid of an electrode matrix is realized in a technologically simple manner. As explained, the screen device, depending upon a design, affords a rapid or a slow writing-in of the data. The flat and panel-shaped screen device can be given virtually any desired size, and the electrode paths of the matrix can be given any desired mutual spacing to produce a coarse or fine raster as may be desired for the particular characters or pictures to be exhibited on the screen panel. The representation on the screen can readily be made sufficiently bright with intensity contrasts suitable to secure a satisfactory indication of data largely independent of the ambient illumination. The screen panels according to the invention further consume little electric power and are controllable by relatively small voltages. This, in turn, contributes to affording a long period of useful life.

To those skilled in the art it will be obvious from a study of this disclosure that the invention permits of various modifications and may be given embodiments other than particularly illustrated or described herein without departing from the essential features of the invention and within the scope of the claims annexed hereto.

I claim:

1. Data indicating screen device, comprising a layer of liquid crystals whose light scattering or transparency is controllable by an electric field, at least one ferroelectric layer extending face-to-face in parallel proximity to said liquid-crystal layer and forming a capacitance controllable by the magnitude of an applied electric field, and electrode means at said ferroelectric layer for applying said electric field.

2. In a device according to claim 1, said ferroelectric layer consisting of ceramic material.

3. In a device according to claim 1, said ferroelectric layer consisting of lead-circonate-titanate ceramic material.

4. In a device according to claim 1, said electrode means comprising two arrays of parallel electrode conductors conjointly forming an X-Y cross-bar arrangement whose intersections define respective raster spots, respective intermediate electrodes interposed between said two layers at said individual raster spots, said two arrays of conductors being arranged on the respective outer sides of said two layers.

5. Device according to claim 1, comprising a transparent front electrode adjacent to said liquid crystal layer through which the data indicated by said liquid crystal layer are visible, said electrode means comprising two arrays of electrode conductor members on opposite sides respectively of said ferroelectric layer, the conductor members in each array extending parallel to each other and transverse to those of the other array to conjointly form an X-Y cross-bar arrangement whose intersections define respective raster elements of said ferroelectric layer to act upon adjacent spots of said liquid-crystal layer.

6. Device according to claim 5, comprising an insulating layer interposed between said ferroelectric layer and said liquid-crystal layer, said insulating layer having respective perforations at said raster spots, whereby said ferroelectric layer is effective to control the optical behavior of said liquid-crystal layer substantially only at said spots.

7. Device according to claim 4, comprising an insulating layer located between said ferroelectric layer and said liquid-crystal layer and having at each of said raster spots a circular hole whose diameter substantially corresponds to the width of those of said electrode conductors that are situated on the outer side of said ferroelectric layer, said liquid-crystal layer having cylindrical protrusions extending into said respective holes, said intermediate electrodes having a diameter substantially equal to the width of those of said electrode conductors that are situated on the outer side of said liquid-crystal layer, and said intermediate electrodes enveloping said respective protrusions and extending concentrically to said protrusions between said insulating layer and said liquid-crystal layer.

8. In a device according to claim 1, said electrode means comprising two arrays of parallel electrode conductors conjointly forming an X-Y cross-bar arrangement whose intersections define respective raster spots, direct-voltage supply means, and electronic switching means connected between said supply means and said electrode conductors of said two arrays.

9. In a device according to claim 1, said electrode means comprising two arrays of parallel electrode conductors conjointly forming an X-Y cross-bar arrangement whose intersections define respective raster spots, a direct-voltage source, respective decoupling diodes connected between said source and said raster spots of said ferroelectrice layer for normally placing said raster spots in saturated condition, and control pulse supply means having a switch connected to said electrode conductors of said two arrays at each of said raster spots for supplying to said spots respective direct-voltage pulses of a given polarity.

10. Device according to claim 5, comprising an insulating layer interposed between said ferroelectric layer and said liquid-crystal layer, said X-conductor members being disposed on the outer side of said ferroelectric layer, said Y-conductor members being disposed on the ferroelectric layer at the side facing said insulating layer, first electrode spots located at said respective intersections on the Y-conductor side of said ferroelectric layer and insulated from said Y-conductor members, second electrode spots located at said respective intersections on said liquid crystal layer at the side facing said insulating layer and electrically connected with the next adjacent one of said first electrode spots, and a front electrode located on the outer side of said liquid crystal raster elements and common to all of said elements.

11. In a device according to claim 10, said Y-conductor members having central circular openings at said respective intersections, said liquid-crystal layer having bulges extending through said insulating layer toward each of said respective openings, and a circular read-out electrode surrounding each of said bulges between said insulating layer and said liquid-crystal layer and extending into the adjacent one of said respective openings.

12. DEvice according to claim 10, comprising direct-voltage means connected to said X-conductor members and said Y-conductor members for controlling said raster elements to be excited in said ferroelectric layer so as to occupy a first remanence state, and direct-voltage pulse control means connected to said X and Y-conductor members and to said common front electrode for energizIng all of the raster elements that are in said first remanence state to flip into the second remanence state.

13. In a device according to claim 1, said ferroelectric layer being composed of individual pieces of ceramic material, and insulating substance filling the gaps between said pieces.

14. In a method of producing a data indicating screen device having a layer of liquid crystals whose light scattering or transparency is controllable by an electric field, a layer of ferroelectric ceramic material in parallel proximity to said liquid-crystal layer, two arrays of parallel electrode conductors conjointly forming an X-Y cross-bar arrangement whose intersections define respective raster spots, and respective intermediate electrodes interposed between said two layers at said individual raster spots, the steps of pressing an insulating photosensitive layer face-to-face upon said ceramic layer so as to bond them together, then exposing said photosensitive insulating layer to illumination at said raster spots and thereafter etching holes into said insulating layer at the exposed spots, and vapor-depositing said intermediate electrodes upon said insulating layer around said respective holes.

* * * * *